3 Sheets—Sheet 1.

W. R. MIDDLETON,

Assignor, by mesne assignments, to W. W. HUNTLEY, A. P. HOLCOMB & A. HEINE.

MACHINE FOR SEPARATING MIDDLINGS.

No. 9,862. Reissued Sept. 6, 1881.

Chas. J. Buchheit
Edw. J. Brady } Witnesses.

W. R. Middleton Inventor.
By Wilhelm & Bonnell
Attorneys.

N. PETERS, Photo-Lithographer, Washington, D. C.

W. R. MIDDLETON,

Assignor, by mesne assignments, to W. W. HUNTLEY, A. P. HOLCOMB & A. HEINE.

MACHINE FOR SEPARATING MIDDLINGS.

No. 9,862. Reissued Sept. 6, 1881.

Witnesses:
Chas. J. Buchheit
Edw. J. Brady

W. R. Middleton Inventor
By Wilhelm & Bonner
Attorneys

N. PETERS, Photo-Lithographer, Washington, D. C.

W. R. MIDDLETON,

Assignor, by mesne assignments, to W. W. HUNTLEY, A. P. HOLCOMB & A. HEINE.

MACHINE FOR SEPARATING MIDDLINGS.

No. 9,862. Reissued Sept. 6, 1881.

Witnesses:
Chas. J. Buchheit.
Edw. J. Brady.

W. R. Middleton Inventor.
By Wilhelm & Bonner
Attorneys.

N. PETERS, Photo-Lithographer, Washington, D. C.

UNITED STATES PATENT OFFICE.

WILLIAM R. MIDDLETON, OF COMMONWEALTH, WISCONSIN, ASSIGNOR, BY MESNE ASSIGNMENTS, TO W. W. HUNTLEY, A. P. HOLCOMB, AND AUG. HEINE.

MACHINE FOR SEPARATING MIDDLINGS.

SPECIFICATION forming part of Reissued Letters Patent No. 9,862, dated September 6, 1881.

Original No. 108,926, dated November 1, 1870; Reissue No. 4,827, dated March 26, 1872. Application for reissue filed August 2, 1880.

DIVISION A.

*To all whom it may concern:*

Be it known that I, WILLIAM R. MIDDLETON, formerly of Cleveland, in the county of Cuyahoga and State of Ohio, now of Commonwealth, in the county of Marinette and State of Wisconsin, have invented certain new and useful Improvements in Machines for Separating Middlings, of which the following is a specification, reference being had to the accompanying drawings.

This invention relates to a machine for cleansing middlings and preparing the same for regrinding by separating therefrom the fine flour, the fine pulverulent impurities or specks, and the coarse bran.

The object of this invention is to so construct the machine as to enable it to effect these separations thoroughly and expeditiously; and my invention consists of the combination of a shaking-screen having a rising-and-falling motion, a hopper arranged lengthwise underneath the screen, in which the sifted middlings are received, a conveyer arranged lengthwise in the hopper, and a suction-fan, as will be hereinafter more fully explained and specifically claimed.

Figure 1:
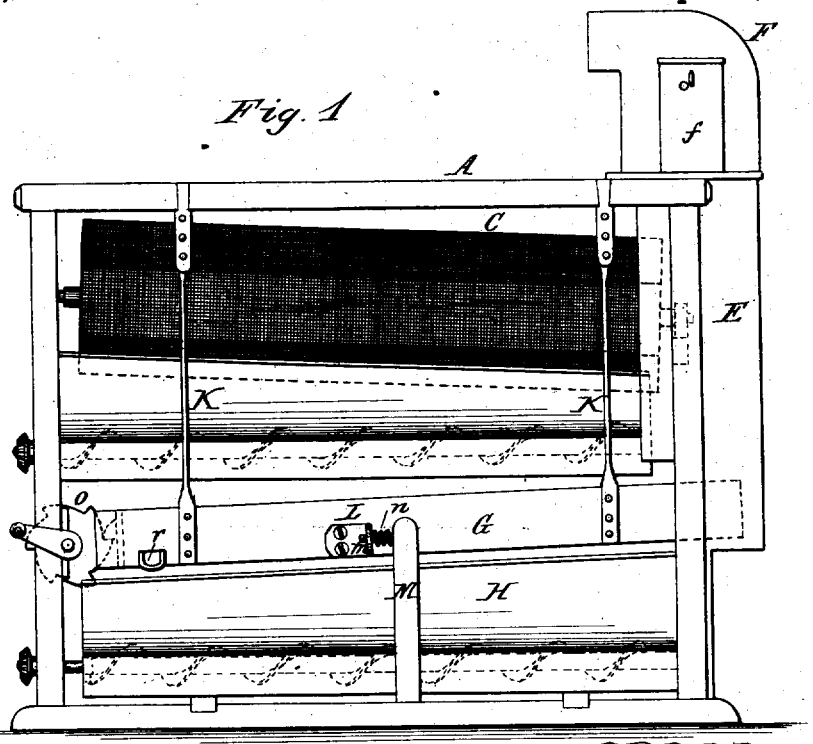
Figure 2:
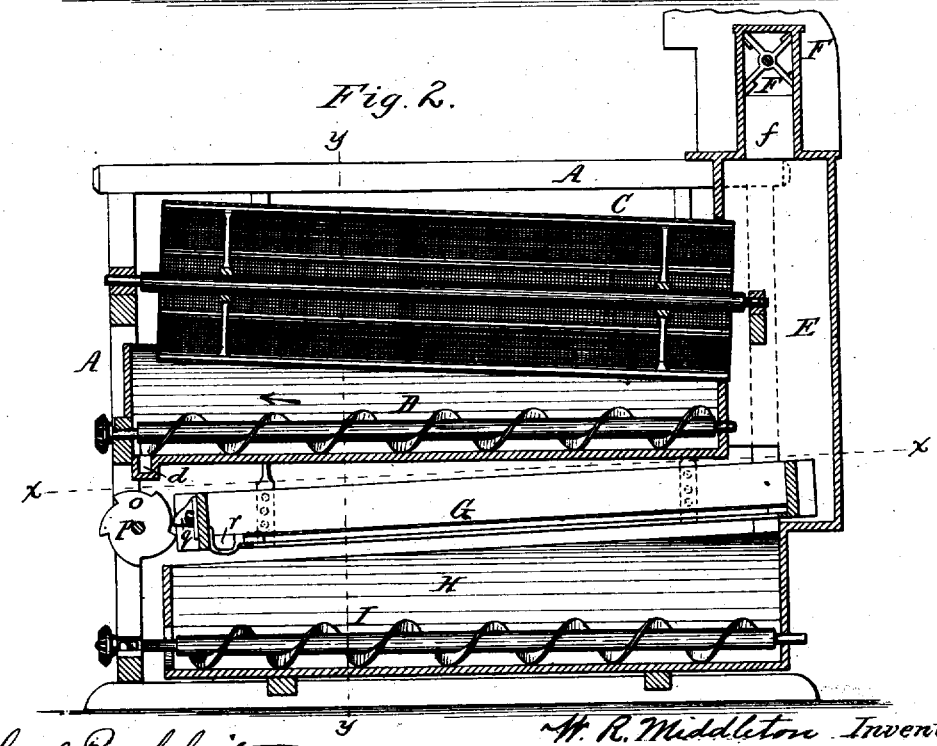
Figure 3:
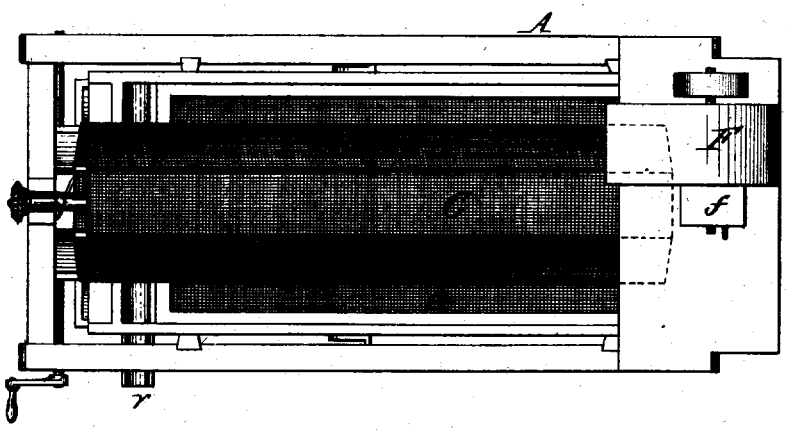
Figure 4:
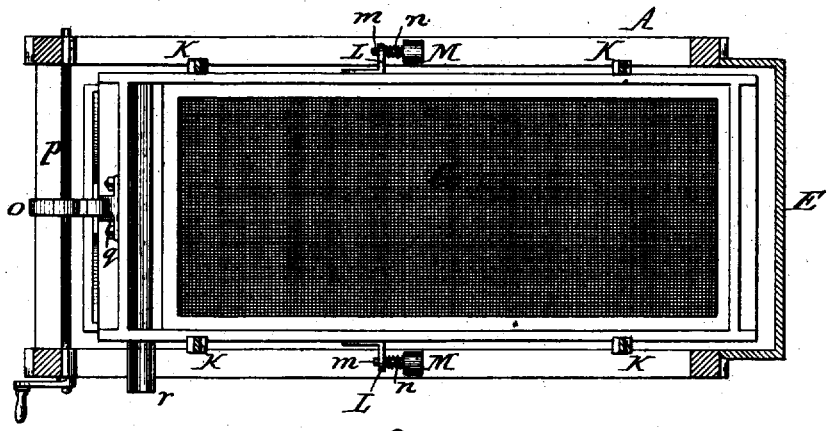
Figure 5:
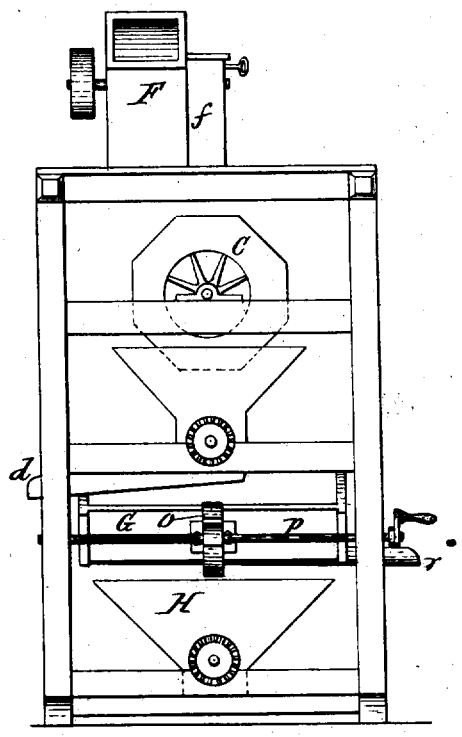
Figure 6:
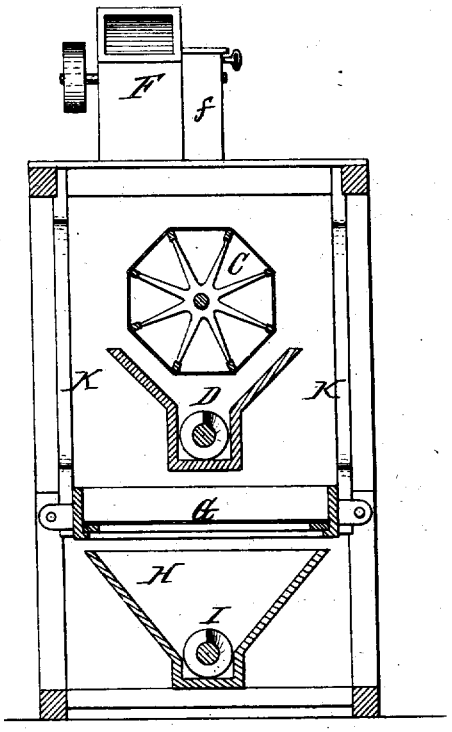

In the accompanying drawings, Figure 1 is a side elevation of my improved middlings-separator. Fig. 2 is a vertical longitudinal section thereof. Fig. 3 is a top-plan view thereof. Fig. 4 is a horizontal section in line *x x*, Fig. 2. Fig. 5 is an end view; and Fig. 6, a vertical cross-section in line *y y*, Fig. 2.

Like letters of reference refer to like parts in the several figures.

In the construction of my improved separator for middlings the frame A, Fig. 1, and the chest for inclosing the reel and sieve may be of any suitable form, as is well known.

C represents the dusting-reel, arranged in the upper part of the frame in a slightly-inclined position and rotated in the usual way.

D represents a screw-conveyer, arranged in a suitable hopper or trough underneath the reel C, for the reception of the fine flour which is sifted through the reel. The conveyer moves the fine flour toward the head of the reel in the direction of the arrow, Fig. 2, and discharges the same through a spout, *d*.

E represents a vertical air-trunk, arranged at the tail end of the reel C, which latter projects into the trunk and discharges its tailings into the same.

F is a suction-fan, arranged above the air-trunk E, and having its eye connected therewith by a spout, *f*.

G represents the shaking-screen, arranged in the lower part of the frame and projecting with its head portion into the lower part of the air-trunk E underneath the tail of the reel C, so that the material which is discharged over the tail of the reel falls through the air-trunk E and upon the head portion of the shaking-screen G. The latter is but slightly inclined from its head toward its tail and has a large area, so as to spread the middlings very thin while being sifted.

H is a hopper or trough, arranged underneath the sieve G for the reception of the sifted middlings, and I is a screw-conveyer, arranged in the hopper or trough H for collecting and remingling the middlings, which are sifted through the bolt from its head toward its tail, and conveying the same to a suitable opening with which the conveyer-trough is provided, and through which the sifted middlings are discharged. The sieve G is suspended by four long slender springs, K, which allow the sieve to move freely, and which are secured with their upper ends to the frame A and with their lower ends to the side pieces of the sieve-frame in a perpendicular position, so as to stand at an angle to the surface of the sieve, whereby a rising-and-falling motion is imparted to the sieve.

L represents a projecting guide or ear, secured to each side of the sieve and provided with a hole through which passes loosely a pin or rod, *m*, which is secured to a short post, M, fastened to the base piece of the frame A.

*n* is a coiled spring, arranged on the pin *m*, between the post M and the guide L.

O represents a cam-wheel, provided with one or more projecting cams and secured to a horizontal shaft P, opposite the tail end of the sieve.

*q* is a projection, secured to the tail-piece of the sieve-frame and adapted to engage in the notches of the cam-wheel. The sieve is set in motion by the revolution of the cam-wheel, and at every notch in the latter the springs *n* push the sieve back suddenly with a sharp stroke upon the cam-wheel. This jarring stroke is similar to that of a hammer against the sieve, and the action is very efficient in sifting the middlings and keeping the meshes of the cloth clean. The coarser particles of bran rise to the top of the layer of material on the sieve and travel toward the spout *r* at the tail end of the sieve, through which they are discharged. The middlings, as they come from the flour-bolts are fed into the head of the dusting-reel C, and first freed by the action of this reel from the fine flour and then delivered into the trunk E, in which they are subjected to the action of the ascending air-current, which separates the lighter particles of bran from the heavier granules of middlings and the larger pieces of bran. The middlings then pass upon the shaking-sieve, where the finer adhering impurities are detached from the middlings by the peculiar jarring motion of the sieve, while the cleansed middlings pass through the sieve and into the hopper H, in which they are remingled and from which they are removed to be reground. The fan produces an outward current of air, whereby the light particles of bran which float about are carried off.

I have shown and described in this division all of the features of novelty included within my invention, but have claimed in another division such as are not claimed in this.

I claim as my invention—

In a middlings-separator, the combination of a shaking-screen having a rising-and-falling motion, a hopper arranged lengthwise underneath the screen, in which the sifted middlings are received, a conveyer arranged lengthwise in the hopper, whereby the sifted middlings are collected and removed, and a suction-fan, whereby the floating impurities are drawn off, substantially as set forth.

WILLIAM R. MIDDLETON.

Witnesses:

JAMES GALBREATH,

G. E. MCISAAC.